Patented Feb. 1, 1938

2,107,012

UNITED STATES PATENT OFFICE 2,107,012

MEANS FOR FEEDING GLASS TO GLASS SHAPING MACHINES

Thomas Courtney Moorshead, London, England, assignor, by mesne assignments, to Ball Brothers Company, Muncie, Ind., a corporation of Indiana Application January 30, 1935, Serial No. 4,193
In Great Britain January 18, 1935

3 Claims. (Cl. 49—5)

This invention relates to means for feeding glass to the moulds of glass shaping machines.

The various forms of glass feeding means at present in use can be divided into two groups or classes viz. those that gather by suction from the surface of a pool of molten glass and those in which the glass is caused or permitted to flow downwardly, primarily by gravity, from an orifice in the floor of an extension of the melting furnace. Feeding means falling within the first group usually involve the employment of an inverted vessel of fixed or predetermined capacity which is lowered to the surface of the glass pool and then exhausted of air so as to cause the glass to completely fill the vessel and such feeding means possess the advantage that a constant and predetermined quantity of glass is gathered at each gathering operation. Feeding means belonging to the second group also possess certain advantages, more particularly in connection with glass forming machines operating on the "press" or the "press and blow" principles. In such machines the upper ends of the blank or charge receiving moulds must necessarily be open and the lower ends thereof must necessarily be closed, and, consequently, it is usually more convenient when employing such machines to arrange for the feeding means to deliver the charges of glass into the blank or charge receiving moulds from above as obtains in the case of the gravity type of feeder.

The chief object of the present invention is to provide an improved form of glass feeding means which combines the advantages of both of the types of feeding means above referred to by gathering glass from a pool in one or more measuring vessels by vacuum and by later transferring such gathers by gravity to the glass forming machine.

A further object of the invention is to provide an improved and simplified form of glass feeding means which will enable the weight and/or the shape of the collected gobs or gathers of glass to be accurately controlled.

Another object of the invention is to provide an improved form of glass feeding means which is particularly, although not exclusively, applicable to the Moorshead type of glass forming machine shown in British Specification No. 281,383.

According to one feature of the invention, an improved form of glass feeding means is provided wherein the glass is sucked upwardly into a measuring or gathering cup depending from a rotatably mounted arm or unit and wherein the cup, after being filled with glass, is raised and swung into a position over a mould on the glass forming machine and into which mould the glass is subsequently discharged.

According to another feature of the invention an improved form of glass feeding means is provided comprising a rotatably mounted unit adapted to be driven from the glass forming machine and including one or more arms having depending therefrom a measuring and suction gathering cup or cups movable, by the rotary movements of said unit, from a position over a forehearth into a position over a mould on the glass shaping machine, the arrangement being such that the cup is also movable vertically with respect to the said unit whereby the cup, after being filled by suction, can be raised and swung into position over a mould so as to permit the glass contained in said cup to be discharged therefrom into said mould.

In order that the said invention may be clearly understood and readily carried into effect, the same will now be more fully described with reference to the accompanying drawings in which:—

Figure 1:
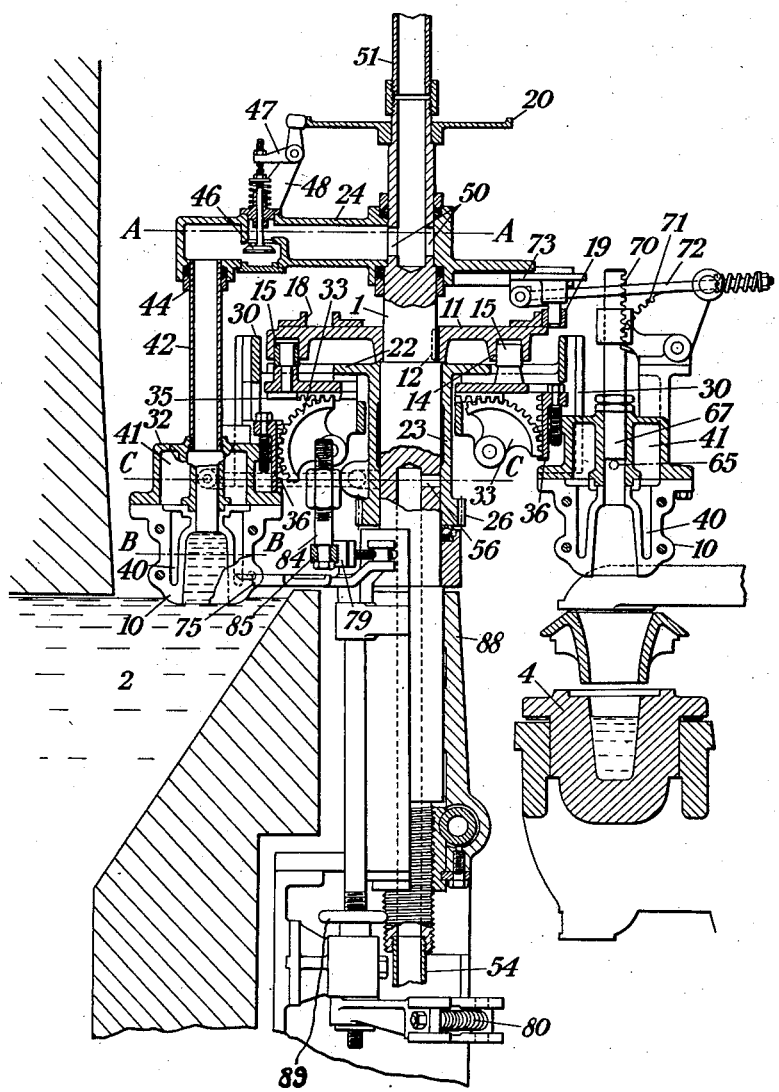
Fig. 1 is a vertical sectional view through one form of glass feeding means incorporating the invention.
Figure 2:
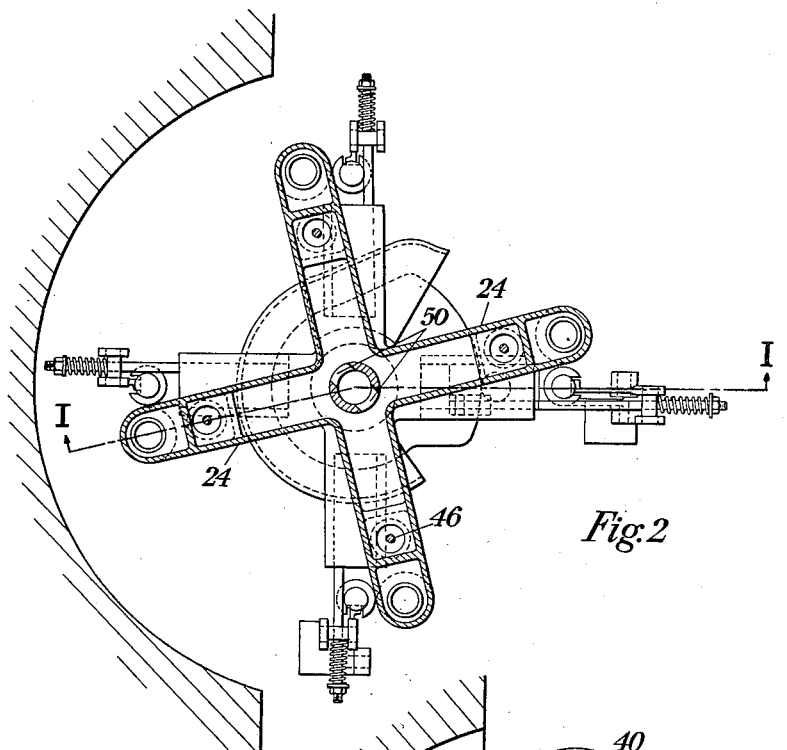
Fig. 2 is a sectional plan view taken on the line A—A of Fig. 1.

The feeding means illustrated in the accompanying drawings comprises a central stationary column 1 disposed in a suitable position between a forehearth, a portion of which is indicated at 2, and a glass forming machine, one of the blank or charge receiving moulds of which is indicated at 4. Rotatable around the stationary column is a plurality of measuring vessels or gathering cups 10 of a capacity suitable for the moulds to be supplied. The gathering cups may be arranged for intermittent or continuous rotation and, in the embodiment illustrated, there are four such cups, although it will be appreciated that the number of cups employed may be varied as desired or according to the type of forming machine employed.

The stationary column 1 serves to support a plurality of stationary cams or cam tracks by which the various movements or operations of the gathering cups and of the other elements co-operating therewith are adapted to be controlled in synchronized succession. In the embodiment illustrated, two such cams or cam tracks are formed upon the upper and lower surfaces of a cam plate 11 which is keyed upon the central column by the key indicated at 12. Co-operating with the lower cam track 14 is a plurality of cam rollers 15 which, through mechanism hereinafter described, are adapted to effect the raising and lowering movements of the gathering cups so that each, as it passes the forehearth, is dipped into the pool of glass and then raised again. Co-operating with the upper cam track 18 is another set of rollers 19 which, as is hereinafter described in detail, serve to control means for admitting compressed air to the gathering cups. In addition a third cam 20 is mounted in position upon the upper end of the stationary column and is adapted to effect the opening and closing movements of a plurality of vacuum valves for supplying suction to the interiors of the gathering cups.

The gathering cups are arranged so that each depends downwardly from the outer end of a radially disposed arm and the said arms are preferably interconnected to form a rotatably mounted spider-like framework which, in the arrangement illustrated, is made up of a lower spider 22 having a downwardly extending sleeve or hub portion 23 surrounding the central column just below the cam plate 11, and of an upper spider 24 surrounding the central column so that it is spaced a short distance above the cam plate 11. Upon the lower end of the sleeve or hub portion 23, a gear wheel 26 is preferably formed for engagement with another gear carried by a driving shaft which is indicated at 27 and which may be driven from any suitable source of power and preferably from the glass forming machine or its actuating means. Each of the arms of the lower spider is formed at its outer end with a vertical guideway 30 upon which the heads 32 of the gathering cups are slidably mounted and beneath each of the said arms is arranged a segmental gear 33. Each such segmental gear engages a pair of toothed racks one of which, namely, the rack 35, is horizontally disposed and carries one of the cam rollers 15 whilst the other toothed rack 36 is vertically disposed and is appropriately secured to one of the gathering cup heads 32. By this arrangement and by an appropriate shaping of the cam track 14, each of the rollers 15 is moved outwardly as the gathering cup associated with such roller approaches the furnace forehearth so as to cause the segmental gear 33 coupled to the roller to be displaced angularly in an anti-clockwise direction and to thereby cause the gathering head to move downwardly over the guideway 30 and the cup to be dipped into the pool of glass. The cup is permitted to remain with its lower end below the surface of the pool of glass only for a period sufficient to enable the complete filling of the cup whereupon the roller is moved inwardly again by the cam track and the segmental gear is turned in the opposite direction to raise the gathering cup.

Figure 3:
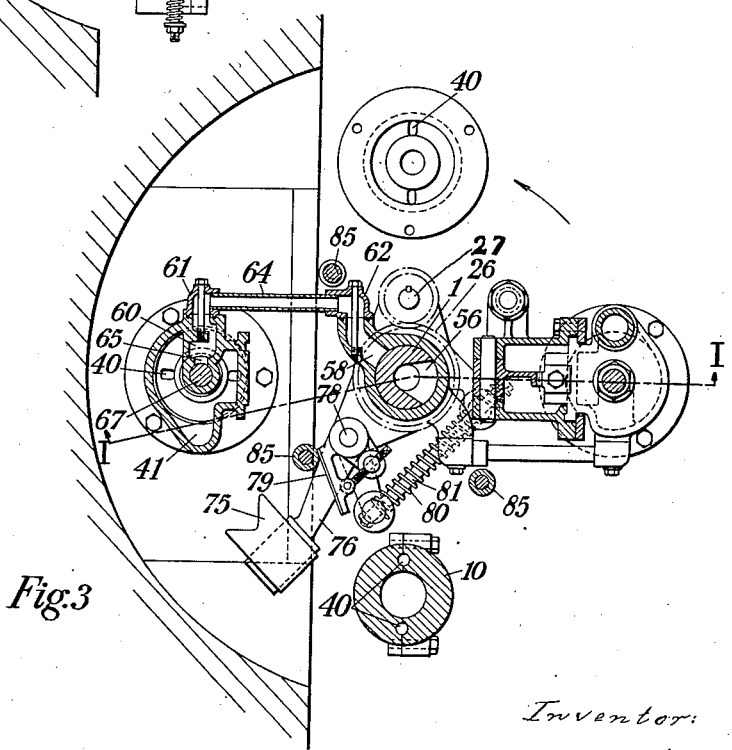
Fig. 3 is a sectional plan view taken on the line C—C of Fig. 1, the lower portion thereof showing a sectional plan view of one of the gathering cups taken on the line B—B of Fig. 1.

As may be seen from the sectional view of the gathering cup shown at the lower portion of Fig. 3, each cup is made up of two half-portions suitably secured together and is formed with a suitable vacuum or suction ports 40 the upper ends of which communicate with a vacuum or suction chamber 41 formed within the gathering cup head 32 (see Figs. 1 and 3). Each of the said vacuum or suction chambers also communicates with one of a plurality of pipes 42 extending upwardly from the gathering cup heads and each of the arms of the upper spider 24 is formed hollow and provided at its outer end and on the under side thereof with a gland 44, the arrangement being such that each of the upstanding pipes passes through one of the said glands. Also, each of the arms of the aforesaid upper spider is equipped with a spring-loaded vacuum valve 46 which is normally closed but which is adapted to be opened at the appropriate time by a bell-crank lever 47 pivotally mounted upon an upwardly extending bracket 48 so that the free end of the lever engages with the vacuum controlling cam 20. It will be observed that the upper portion of the central column is formed hollow and that the portion around which the upper spider rotates is formed with ports 50 by which, in certain positions of the upper spider, communication is established between the interior of the column and the interiors of certain of the arms of the upper spider. At its upper end the central column is coupled to a pipe 51 which is connected to a suitable source of vacuum (not shown) and, from the foregoing description, it will be appreciated that, whenever one of the arms of the upper spider 24 is brought into registration with one of the ports 50 and the bell-crank lever carried by such arm is operated to open the vacuum valve 46 associated therewith, communication will be established between the source of vacuum and the interior of the gathering cup so as to produce a suction effect in the latter.

Means are also provided for supplying pressure or compressed air to the interiors of the gathering cups and, for this purpose, the lower end of the central stationary column is also formed hollow and suitably connected as by the pipe 54 with a source of compressed air (not shown). Also, a radially disposed port 56 is formed in the said column a short distance above the lower end of the sleeve or hub portion 23 of the lower spider 22 and the sleeve is formed, in this region, with a plurality of ports 58 which, by the rotary movements of the spider, are adapted to be brought successively into registration with the port 56, it being appreciated that the number of ports 58 corresponds with the number of arms or gathering cups employed. In addition, each of the ports 58 is suitably connected with a pressure chamber 60 formed in each of the gathering cup heads, the connections being indicated by a pair of elbow bends 61 and 62, one of which is connected with one of the ports 58 in the sleeve and the other with one of the pressure chambers 60, and by a pipe 64 inserted in position between the two elbow bends. Each of the pressure chambers is adapted to communicate by a port 65 with a cylinder which is provided at the inner portion of the gathering cup head so that its lower end opens into the upper end of the gathering cup cavity and which is fitted with a vertically movable valve or piston 67 controlling the port 65. In the normal positions of the pistons 67, the ports 65 are covered thereby but, when pressure is to be delivered to any of the gathering cups, the piston associated therewith is raised so as to uncover the port 65 and thus establish communication between the interior of the cup and the pressure chamber 60. Providing that, at this instant, the pressure chamber in question then has its port 58 disposed opposite the port 56, communication will be established between the gathering cup cavity and the source of pressure. The means for raising and lowering the pistons 67 comprise toothed racks 70 formed upon upward prolongations of the pistons, each rack being arranged so that it engages with a segmental gear 71 mounted in position upon an upper portion of the associated gathering cup head and each such segmental gear being coupled, as for example by a link 72, to a radially movable slide 73 to which is connected one of the cam rollers 19 controlled by the cam track 18.

Suitable means may also be provided for cutting off the glass collected by the gathering cup as the latter moves away from the gathering position. Such means may comprise a cut-off knife 75 carried by an arm 76 pivoted at 78 to a suitable stationary part of the machine, the said arm having a cam-like member 79 adjustably but rigidly secured to it so as otherwise in effect to be a part of such arm and the parts being arranged so that they are normally held in the positions shown in Fig. 3 by a spring 80 surrounding a rod 81 which is suitably coupled to the pin upon which the arm 76 is pivotally mounted. Also, projecting downwardly from the lower spider 22 are a plurality of studs 84 corresponding in number with the number of gathering cups employed, the studs being fitted with rollers 85 and being disposed in such positions that the rollers are adapted to engage with the cam-like member 79 during the rotary movements of the spider. In practice, the studs are so arranged that each roller, in turn, is caused to press against the cam-like member 79 and to swing the cut-off knife 75 in a counter-clockwise direction around its pivot against the opposition of the spring 80 until the studs have moved pass the cam-like member whereupon the knife is returned to its normal position under the pressure of the spring, such return movement being utilized and timed to effect the cutting stroke of the knife as a gathering cup leaves the forehearth. Means are also preferably provided for enabling the height of the knife to be adjusted to suit the form of gathering cup employed in any particular instance and, if desired, means may be provided for enabling the machine to be adjusted vertically as a whole. For instance, the central column may be suitably supported in a pedestal 88 which may be carried by the wall of the forehearth and a handwheel 89 may be provided so as to enable the pedestal to be adjusted vertically.

In operation, each gathering cup is caused as it approaches the gathering position, to descend until its lower open end dips beneath the surface of the pool of glass in the foreheath, such descent being brought about by the co-operation of its cam roller 15 and the cam track 14 and by the operation of the racks 35 and 36. Also, at this stage, the upper spider 24 is in such a position that the hollow arm thereof located above the lowered gathering cup is brought into registration with one of the vacuum ports 50 and the vacuum valve 46 carried by said arm is opened by the cam 20 so that a suction effect is produced within the cavity of the lowered gathered cup through the communication established by way of the vertical pipe 42, suction chamber 41 and suction ports 40. As a result a predetermined quantity of glass is sucked upwardly to fill the gathering cup which is then caused to rise again by a reverse or inward movement of the cam roller 15 which is, at this stage, produced by the cam track 14. At this period, one of the rollers 85 located adjacent the operating gathering cup is brought into engagement with the cam-like member 79 and, as hereinbefore described, the cut-off knife 75 is actuated to sever the mass of glass contained in the gathering cup from the mass of glass in the forehearth pool. The suction effect upon the glass in the gathering cup may be maintained up to any predetermined point prior to reaching the position at which the charge of glass is to be ejected from the cup into the mould on the glass shaping machine but just before reaching this point the vacuum valve 46 is closed by the bell crank lever 47 operating with the cam 20. Also, as the charged gathering cup reaches its discharging position, the piston 67 is raised by the operation of the cam roller 19 in the cam track 18 to uncover the port 65 and the ports 58 and 56 are brought into registration so that compressed air is admitted to the upper end of the charged gathering cup.

This serves to eject the charge of glass therefrom so that it is caused to fall into the open end of a blank or charge receiving mould 4 of the glass forming machine the operations of which are so timed that the mould 4 is, at this instant, in axial alignment with the discharging gathering cup. It will be appreciated that these operations are repeated with each of the gathering cups in turn and that the machine is preferably designed so that whilst one is discharging, another or the others are being charged or have been charged and are being carried towards the discharging position.

Having thus described this invention what I claim as new therein and desire to secure by Letters Patent is:—

1. Apparatus for feeding glass from a forehearth to the molds of a glass-shaping machine comprising a central vertical column having two cavities therein one of which is coupled to a source of pressure and the other to a source of suction and having ports formed in the wall thereof, a frame rotatable around said column and having a plurality of hollow arms extending radially therefrom adapted to move in succession past one of the ports in said column, a valve in each such arm, a suction cup associated with each of said arms, a pipe telescoping into each of said arms for establishing communication between each said arm and the cup associated therewith, means for rotating said frame to move said cups from a position over the forehearth to a position over a mold, means for raising and lowering each of said cups relative to its supporting arm, means controlled by the rotary movement of said frame for operating said cup raising and lowering means to cause each cup to dip into the forehearth, means responsive to the rotation of said frame for operating said valves to connect the interior of said cups to a source of suction and gather a charge of glass therein when said cups are in their lowered position, a severing mechanism, means controlled by the rotary movement of said frame for actuating said severing mechanism to cause it to pass beneath each cup as it leaves the forehearth to sever the glass stringing therefrom, and means controlled by the movement of said frame for connecting said cup to the pressure cavity in said column to discharge the glass gathered in said cup into the mold of the shaping machine.

2. Means for feeding glass according to claim 1 in which a plunger is mounted in each cup and is movable vertically in response to the rotation of the spider for uncovering a port in the cup to control the admission of pressure thereto.

3. Means for feeding molten glass from a forehearth to the molds of a glass shaping machine comprising a central stationary column having two cavities therein, one of which is coupled to a source of pressure and the other is coupled to a source of suction and having ports formed in the wall thereof, a spider rotatable around said column and having radially projecting hollow arms adapted to move in succession past one of the ports in said column, each said arm having a ported partition therein for dividing the interior thereof into two chambers, a valve controlling communication between the chambers in each arm, a measuring and gathering cup associated with each arm and having separate pressure and vacuum chambers therein, a pipe connected to the vacuum chamber of each of said cups and telescopically connected with the arm associated therewith, means responsive to the rotation of said spider for operating said valves to establish communication between the vacuum chambers of said cups and the source of suction, and means responsive to the rotation of said spider for raising and lowering said cups.

THOMAS COURTNEY MOORSHEAD.